Figure 1:
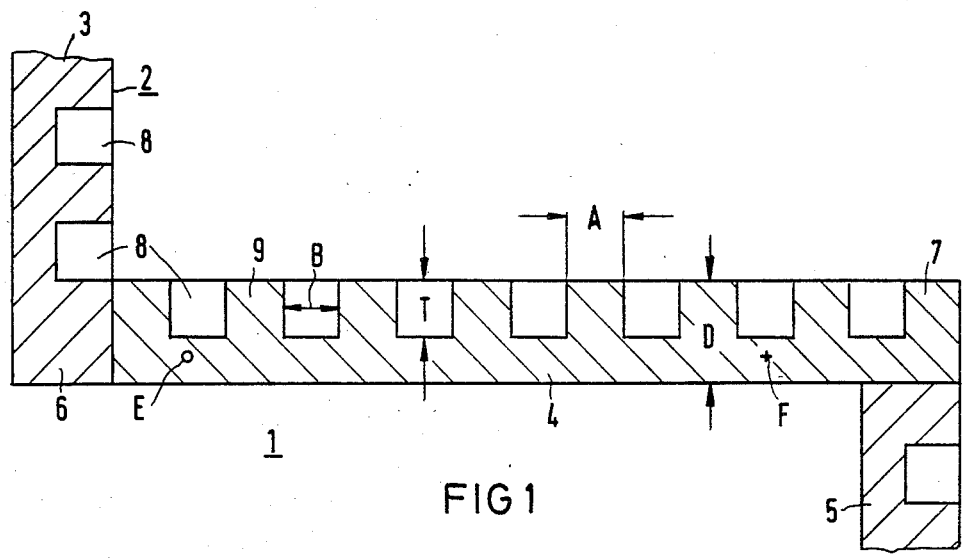

United States Patent [19]

Ulrych

[11] Patent Number: 4,587,086
[45] Date of Patent: May 6, 1986

[54] NUCLEAR REACTOR

[75] Inventor: Gerhard Ulrych, Erlangen, Fed. Rep. of Germany

[73] Assignee: Kraftwerk Union Aktiengesellschaft, Mülheim an der Ruhr, Fed. Rep. of Germany

[21] Appl. No.: 683,325

[22] Filed: Dec. 18, 1984

Related U.S. Application Data

[63] Continuation of Ser. No. 362,443, Mar. 26, 1982, abandoned.

[30] Foreign Application Priority Data

Apr. 3, 1981 [DE] Fed. Rep. of Germany ....... 3113587

[51] Int. Cl.$^4$ .................. G21C 13/00; G21C 15/00
[52] U.S. Cl. .................... 376/399; 376/294; 376/463; 52/602; 220/72; 220/83
[58] Field of Search .............. 376/293–296, 376/381, 359, 360, 389, 390, 399, 400, 377, 354, 463; 52/602, 573, 302; 220/72, 83

[56] References Cited

U.S. PATENT DOCUMENTS

| 973,165 | 10/1910 | Cahill | 52/602 |
|---|---|---|---|
| 2,780,596 | 2/1957 | Anderson | 376/294 |
| 2,885,335 | 5/1959 | Moore et al. | 376/454 |
| 3,124,001 | 3/1964 | Conley | 220/72 |
| 3,336,203 | 8/1967 | Rausch et al. | 376/381 |
| 3,372,092 | 3/1968 | Margen | 376/295 |
| 3,454,080 | 7/1969 | Kunzli | 376/296 |
| 3,845,593 | 11/1974 | Zen | 52/602 |
| 3,963,936 | 6/1976 | Lowe | 376/293 |
| 3,998,057 | 12/1967 | Haferkamp et al. | 376/293 |
| 4,111,328 | 9/1978 | Eggert et al. | 220/72 |
| 4,158,605 | 6/1979 | Cooper, Jr. et al. | 376/400 |
| 4,192,718 | 3/1980 | Janakiev | 376/294 |
| 4,254,885 | 3/1981 | Fouss et al. | 220/72 |
| 4,382,908 | 5/1983 | Petersen | 376/381 |

FOREIGN PATENT DOCUMENTS 1049984 2/1959 Fed. Rep. of Germany ...... 376/360

Primary Examiner—Harvey E. Behrend
Attorney, Agent, or Firm—Herbert L. Lerner; Laurence A. Greenberg

[57] ABSTRACT

Nuclear reactor with a radiation-emitting core including a container for conducting a coolant, the radiation-emitting container having a wall formed with a plurality of slots disposed parallel to one another, the slots having a depth within the wall equal to at least one-fourth the thickness of the wall, the slots being spaced from one another a distance which is at most as great as the depth thereof.

3 Claims, 2 Drawing Figures

NUCLEAR REACTOR

This application is a continuation of application Ser. No. 362,443, filed Mar. 26, 1982, now abandoned.

The invention relates to a nuclear reactor with a radiation-emitting core and a container or shroud enclosing the latter for conducting a coolant. In such reactors, the radiation in the container enclosing the core generates heat which results in temperature differences which depend upon the power density. The power density may have differences in circumferential direction of the reactor core, so that temperature stresses and buckling of the container, which is formed of metal plate, cannot be precluded unless special countermeasures are taken. These countermeasures, among which, for example, mechanical reinforcements, struts or the like are conceivable, can in turn result again in heating and thermal stresses and, in addition, require and undesirably great expense, so that it is an object of the invention of the instant application to provide a nuclear reactor with a better solution of the problem of varied heat production.

With the foregoing and other objects in view, there is provided, in accordance with the invention, a nuclear reactor with a radiation-emitting core comprising a container for conducting a coolant, the radiation-emitting core being received in the contained, the container having a wall formed with a plurality of slots disposed parallel to one another, the slots having a depth within the wall equal to at least one-fourth the thickness of the wall, the slots being spaced from one another a distance which is at most as great as the depth thereof.

Through the arrangement of the slots, the breadth or width of which is advantageously at least equal to the depth in accordance with another feature of the invention, the heat generation, as compared with a vessel without slots, is reduced to a much greater extent than is the mechanical strength due to the slots. At the same time, heat removal is improved so that the temperature differences are drastically reduced. Consequently, the mechanical stresses are also reduced, Thus, the invention offers a possibility of making the vessel walls lighter and, especially, thinner or narrower.

The invention is suited particularly for core enclosures or baffles of light-water reactors. In a core enclosure of a pressurized-water reactor confining the reactor core, in accordance with a further feature of the invention, the slot depth is advantageously about one-half the wall thickness.

In accordance with an additional feature of the invention, the core enclosure or container is formed of wall parts extending perpendicularly to one another and define corners in the interior of and exterior to the core, the wall parts being formed with slots only in the region of the inner core corners, for example over one-half the width of the wall parts, as they constitute locations at which particularly high heat production occurs. However, in accordance with a concomitant feature of the invention, it is also entirely possible to provide the entire surface of the container with slots, with the exception of fastening or connecting locations, and specifically on the side of the container wall facing the core or facing away from it or even on both sides thereof.

Other features which are considered as characteristic for the invention are set forth in the appended claims.

Although the invention is illustrated and described herein as embodied in a nuclear reactor, it is nevertheless not intended to be limited to the details shown, since various modifications and structural changes may be made therein without deparing from the spirit of the invention and within the scope and range of equivalents of the claims.

Figure 2:
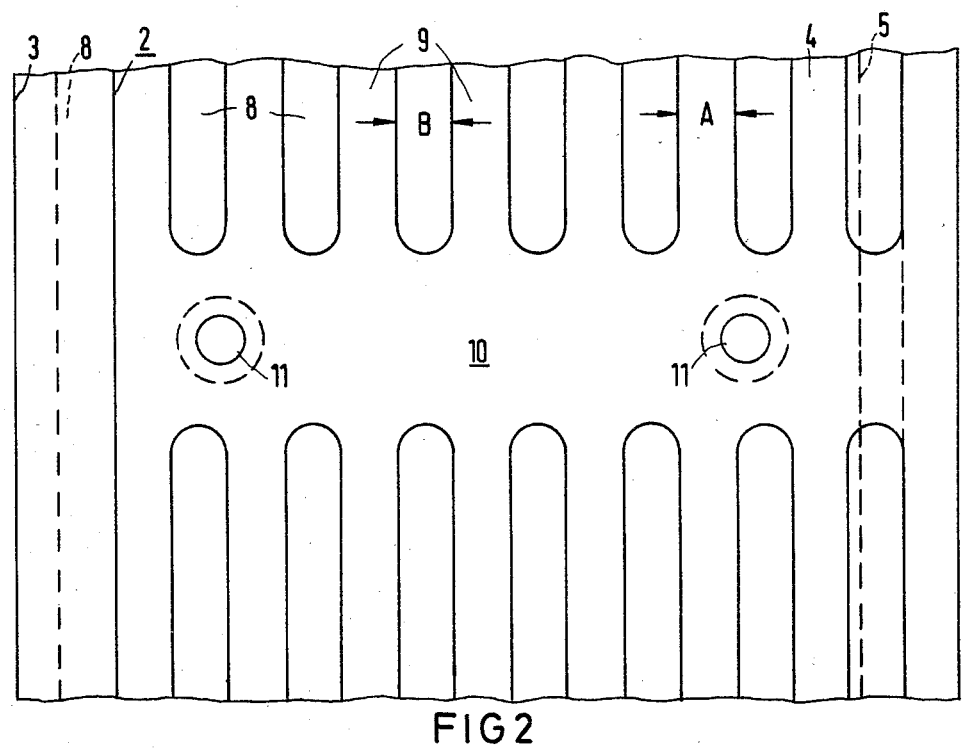

The construction and method of operation of the invention, however, together with additional objects and advantages thereof will be best understood from the following description of specific embodiments when read in connection with the accompanying drawings, in which:

FIG. 1 is a fragmentary cross-sectional view of a wall of a core container in a pressurized-water reactor; and FIG. 2 is a top plan view of FIG. 1.

Referring now to the drawing and first, particularly, to FIG. 1 thereof, there is shown a core enclosure 2 which is fitted or matched to non-illustrated square-cross section fuel assemblies of the reactor core 1 and forms a container assembled from individual flat metal plates as wall parts 3, 4, 5 and so on. The metal plates are formed of austenitic material and have a wall thickness D equal to 23 mm. The wall parts 3, 4, 5 are perpendicular to one another and form corners 6 interior to the core 1 and corners 7 exterior to the core 1.

The wall parts 3, 4, 5, at the outside thereof facing away from the core 1, are formed with mutually parallel slots 8 which have the approximately square cross section shown in FIG. 1. The depth T of the slots 8 is 13 mm i.e. more than half the wall thickness D. The distance A between two adjacent slots is, at most, likewise 13 mm, but preferably smaller, and is limited only by the minimum mechanical strength of the wall parts 3, 4, 5. The breadth or width B of the slots, which should be at least 10 mm in order to ensure good cooling, is likewise approximately 13 mm in the illustrated embodiment. It may also be greater, however.

FIG. 2 shows that the slots 8 extend over practically the entire outside of the core enclosure or container. Only the area 10 which is provided for fastening and is formed with holes 11 provided for connecting locations, is otherwise left untouched i.e. without slots, over a width of about 40 mm. The longitudinal direction of the slots 8 coincides with the flow direction of the cooling water, which flows downwardly through and adjacent the inside wall of the core enclosure or container 2 at low speed and flows upwardly through the reactor core 1 at high speed from the bottom thereof. In any event, resulting ribs 9 remaining for the distance A between the slots 8 formed in the wall parts or baffles 3, 4, 5 should impede as little as possible the cooling flow desired for heat removal.

Calculations indicate that the non-uniform power generation based on neutron and gamma radiation in the core enclosure or container 2 which is, for example, 14300 kW/m$^3$ at the location E marked by a circle in the corner 6 of the core interior, while the location F marked by a cross in the corner 7 of the core interior is subjected to less than one-fourth thereof, namely 3000 kW/m$^3$, is absorbed or removed considerably more advantageously with the construction according to the invention of the instant application than by the otherwise customary solid metal plates. Under otherwise identical conditions, the temperature differences between the locations E and F, which are about 200 mm away from one another, reduce from about 40° K. to 10° K. or less i.e. to one-fourth. This reduces the stresses not only at the individual plates 3, 4, 5 and so on, but also at the junction or connecting locations of the plates 3, 4, 5 and so on.

The foregoing is a description corresponding to German Application No. P 31 13 587.0, dated Apr. 3, 1981, the International priority of which is being claimed for the instant application, and which is hereby made part of this application. Any discrepancies between the foregoing specification and the aforementioned corresponding German application are to be resolved in favor of the latter.

I claim:

1. In a nuclear reactor having a radiation-emitting core, a container enclosing the core for conducting coolant therethrough, the container comprising a plurality of individual flat metal plates formed of austenitic material and having a given thickness, said plates being disposed perpendicularly to one another at respective ends thereof so as to form container walls with corners, respectively, interior and exterior to the core, said plates forming said container walls having a plurality of parallel slots formed therein exterior to the core so as to increase the heat transfer interface area of the container and the surroundings, said slots having a depth within said plates equal to at least one-fourth said given thickness of said plates, said slots also having a breadth which is at least as great as said depth of said slots, and being spaced from one another a distance which is at most as great as said depth thereof.

2. Nuclear reactor according to claim 1 wherein said slots have a depth which is substantially half the thickness of said plates.

3. Nuclear reactor according to claim 1 wherein said slots are formed in said plates in vicinity of said corners interior to the core.

* * * * *